E. RUUD.
INDIRECT WATER HEATING SYSTEM.
APPLICATION FILED MAY 12, 1909.

975,895.

Patented Nov. 15, 1910.
2 SHEETS—SHEET 1.

Witnesses:
J. P. Appleman,
Alberta Reahard

Inventor
Edwin Ruud
By Jno Herbert
Atty

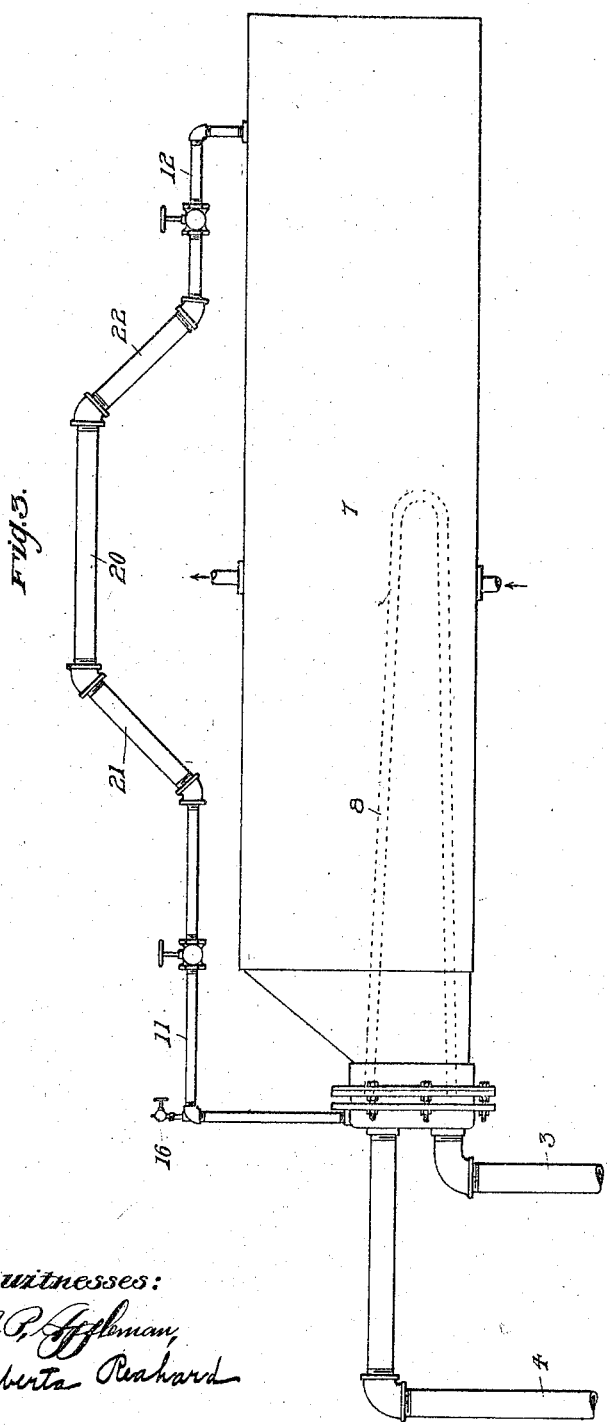

UNITED STATES PATENT OFFICE.

EDWIN RUUD, OF PITTSBURG, PENNSYLVANIA.

INDIRECT WATER-HEATING SYSTEM.

975,895.  Specification of Letters Patent.  Patented Nov. 15, 1910.

Application filed May 12, 1909. Serial No. 495,490.

*To all whom it may concern:*

Be it known that I, EDWIN RUUD, a resident of Pittsburg, in the county of Allegheny and State of Pennsylvania, have invented certain new and useful Improvements in Indirect Water-Heating Systems, of which the following is a specification.

The primary object of this invention is to provide for automatically maintaining a full supply of water in the circulating coils of an indirect water heating storage system without a general intermingling of the water in the coils with that in the storage tank, provision being had for admitting the same to the coils only when the latter suffer loss through leakage or otherwise, and then only in such amount as is necessary to replenish the loss.

So-called direct storage water-heating is not practical in connection with hard water, and sulfur and other waters containing impurities, for the reason that the lime and other solids and impurities thereof deposit in the heater coils or on its heating surfaces, and such accumulations detract greatly from the efficiency of the heater and result finally in destroying the same. To overcome this difficulty indirect heating is resorted to, *i. e.* heat derived from a substantially unchanging body of water circulating through the heater and through coils or other means exposed to the tank or the water therein, thus heating the latter indirectly by conduction.

The invention as here embodied provides a means of communication between the storage tank and the heater circulating system, such means providing an elastic air pocket which forms, in effect, a partition or diaphragm between the waters of the tank and circulating system and prevents intermingling excepting when necessary to replenish the supply in the latter. The water of the heater is thus maintained at main pressure, as in the tank, and the operation is so thoroughly automatic as to require absolutely no attention after being once started.

The heater and its coils or circulating system may be filled initially with soft water, or the same may be charged with hard water from the storage tank. In either case only such additional amounts of hard water are admitted as are necessary to keep the apparatus filled. While it may be desirable to charge the apparatus in the first instance with soft water, hard water for such use is not greatly detrimental, as the few gallons required do not carry sufficient deleterious matter to be of any great moment, and the same is true of the comparatively small replenishing amounts subsequently admitted.

Figure 1:
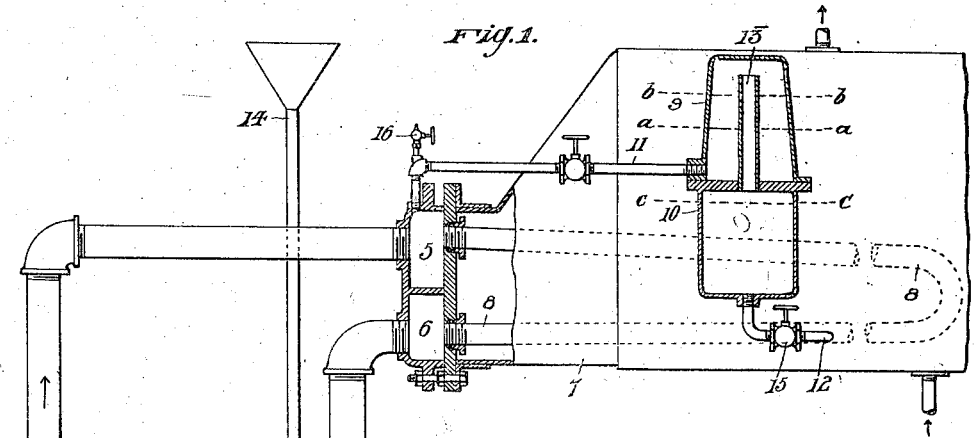
Figure 2:
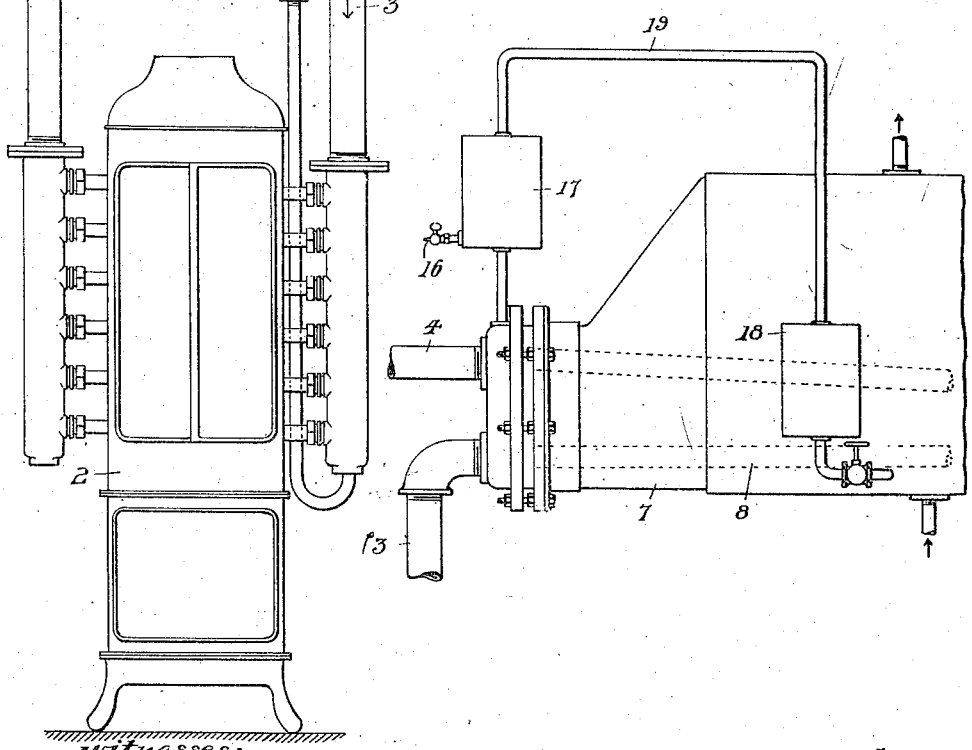

The invention may be variously embodied and applied, Figure 1 of the accompanying drawings showing in section one adaptation thereof, and Figs. 2 and 3 illustrate other embodiments.

Referring to the drawings, 2 is any suitable circulating water heater, preferably of the Ruud type, with the usual risers or circulating pipes 3 and 4, the water entering through 3 and flowing outward through 4. These pipes connect, respectively, with the heads or manifolds 5 and 6 at the end of storage tank 7.

8 is one of a series of duplicate coils or return bends within the tank and connectings heads 5 and 6, with the upper branch inclined slightly to facilitate the circulation. These coils or bends comprise only one of various circulating heat-conducting means that may be employed, and it will be understood the invention is not limited in this regard.

With the heater and coils or other circulating means filled and the heater in operation the water will maintain a continuous circulation, at least until the water in the tank has become fully heated, the inclination of the upper branches of the coils or bends, in the adaptation shown, inducing movement of the water as its heat is absorbed by the cooler water of the tank, causing the same to flow back to the heater and thus maintain continuous circulation. A single charge or volume of water is thus used for transmitting the heat, and the heater is not affected by the injurious properties of the water in the storage tank. There is, however, unavoidable shrinkage of the water in the heater through leakage and other causes, and in the absence of replenishing means the heater would eventually run dry and burn out. This the present invention avoids by maintaining the water in the heater at tank pressure, with means for automatically admitting water thereto as may be necessary to keep the heater and circulating means constantly filled. In the adaptation of Fig. 1, this is accomplished by two chambers 9 and 10, the former superposed on the latter with pipe 11 connecting the bottom of chamber 9 with head 5 of outflow riser 4. A pipe 12 connects the bottom of chamber 10 with tank 7. Chambers 9 and 10 communicate through pipe 13 rising in chamber 9 nearly to the top thereof. Chamber 9 is necessarily at a greater elevation than the water circulating means of the heater.

The heater may be filled initially either from tank 7, or with soft water through the filling pipe 14 connected to one of the risers. If from tank 7, valve 15 in pipe 12 is opened and water flows outward through chambers 10, pipe 13, chamber 9 and pipe 11 to the circulating system, and the flow will continue until stopped by the accumulation of air in the upper portion of the circulating system, the water forcing such air out of the heater and lower portions of the circulating pipes, as will be understood. The air may then be released through pet-cock 16, and this may remain open until a solid stream of water is discharged which will indicate that the water has filled the upper part of the circulating system, when the pet-cock is closed. But a pocket of air remains in the upper portion of chamber 9, the approximate level of the water in said chamber before being heated being at substantially the plane a—a, Fig. 1, and with water extending to approximately the top of tube 13. When the heater is in operation, the expansion due to the rise in temperature will raise the water level in chamber 9 to approximately the line b—b, the resulting pressure forcing the air downwardly through tube 13 and placing the level in chamber 10 at substantially the plane c—c.

From the foregoing it will be seen that variations of temperature of the water and the resulting expansion and contraction will cause the air pocket to shift or oscillate, as it were. But at all times said air pocket forms a flexible cork, partition or diaphragm between the water of the tank and the water of the circulating system and prevents them from mingling, at the same time maintaining the water of the circulating system at the pressure of the water in the tank.

Shrinkage of water in the circulating system, due to leakage or other causes, results of course in lowering the level in chamber 9 and permits a corresponding rise and overflow into said chamber from pipe 13. But obviously the quantity of water thus added to the circulating water cannot be more than the shrinkage suffered by the water, and the amount should be so small as to be negligible so far as its deleterious properties are concerned.

As before indicated, even if the circulating system is filled in the first place with hard water it is not seriously objectionable so long as the same is not constantly changed, nor are the slight replenishments, above indicated, objectionable. The main purpose is to keep the circulating water and the water within the tank substantially separate, and this the invention accomplishes in a most effective manner.

In the adaptation of Fig. 2, the two chambers 17 and 18 (corresponding to chambers 9 and 10) are separated and connected by the upwardly arched pipe 19, the function of which is the same as pipe 13, Fig. 1.

In the construction shown in Fig. 3, the chamber in which the air is confined which forms the water separating cork partition or diaphragm is embodied in pipe 20, here shown in horizontal position, with depending leg 21 at one end thereof connected to pipe 11 leading to the circulating system, and the other end connected by a like depending leg 22 to pipe 12 from tank 7. The several parts are so arranged and proportioned that under normal conditions the water levels in legs 21 and 22 are beneath the plane of pipe 20. At least this is true of leg 22 even though the expansion due to heating the water may force it part way into pipe 20 from leg 21, the intervening air space or pocket preventing the waters from mixing. But when shrinkage of the circulating water occurs, its level lowers in leg 21 and the tank pressure forces the level upward in leg 22 and passes a sufficient quantity through pipe 20 to replace that which has been lost. The level of the circulating water being thus restored the dividing air pocket again becomes effective, as will be understood.

It will be understood from the foregoing that the invention may be variously embodied and applied, and hence I do not desire to restrict myself to any specific arrangement of apparatus for putting the same into effect.

I claim:—

1. The combination of a water heater, a storage tank, water circulating means for the heater imparting heat to the tank, and a two-part chamber at the exterior of the tank with the parts thereof communicating with each other and connected respectively to the tank and to the circulating means, the chamber providing a pocket for air confined between and separating the water of the circulating means from the water of the storage tank.

2. The combination of a water heater, a storage tank, water circulating means for the heater imparting heat to the tank, two pipes—one extending from the circulating means and the other from the tank, and means at the exterior of the tank providing communication between the pipes and located at a greater elevation than the circulating means, said communicating means forming a pocket for confining air which normally separates the water of the circulating means from the water of the tank.

3. The combination of a water heater, a storage tank, water circulating means for the heater imparting heat to the tank, a chamber at the exterior of the tank and at a greater elevation than the circulating means and in communication therewith, and a connection extending upwardly from the tank and communicating with the said chamber at a point higher than where the latter communicates with the circulating means.

4. The combination of a water heater, a storage tank, water circulating means for the heater imparting heat to the tank, a chamber located at the exterior of the tank and above the circulating means, means establishing communication between the lower end of the chamber and the circulating means, and means extending upwardly with its lower end in communication with the tank and its upper end in communication with the said chamber above the lower end of the latter.

5. The combination of a water heater, a storage tank for the water under pressure, water circulating means for the heater imparting heat to the tank, an air-pocket-forming chamber at the exterior of the tank and at a greater elevation than the circulating means and having communicating parts thereof connected respectively to the latter and to the tank, and a valved air outlet for the circulating means.

In testimony whereof I affix my signature in presence of two witnesses.

EDWIN RUUD.

Witnesses:
J. M. NESBIT,
A. C. WAY.